(12) United States Patent
Patwardhan et al.

(10) Patent No.: US 11,622,364 B2
(45) Date of Patent: \*Apr. 4, 2023

(54) BASIC SERVICE SET COLOR-BASED EFFECTIVE ISOTROPIC RADIATED POWER ASSIGNMENT FOR ENTERPRISE NETWORKS

(71) Applicant: Hewlett Packard Enterprise Development LP, Houston, TX (US)

(72) Inventors: Gaurav Patwardhan, Santa Clara, CA (US); Sachin Ganu, San Jose, CA (US); Eldad Perahia, Park City, UT (US); Dongwoon Hahn, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/027,908

(22) Filed: Sep. 22, 2020

(65) Prior Publication Data

US 2021/0007121 A1 Jan. 7, 2021

Related U.S. Application Data

(63) Continuation of application No. 15/966,971, filed on Apr. 30, 2018, now Pat. No. 10,827,513.

(51) Int. Cl.
*H04W 84/12* (2009.01)
*H04W 72/1263* (2023.01)
*H04W 88/08* (2009.01)

(52) U.S. Cl.
CPC ........ *H04W 72/1263* (2013.01); *H04W 84/12* (2013.01); *H04W 88/08* (2013.01)

(58) Field of Classification Search
None
See application file for complete search history.

(56) References Cited

U.S. PATENT DOCUMENTS 7,599,714 B2 10/2009 Kuzminskiy
9,019,936 B2 4/2015 Backes
(Continued)

FOREIGN PATENT DOCUMENTS

CN 104412677 A 3/2015
CN 104954297 A 9/2015
(Continued)

OTHER PUBLICATIONS

Cisco, "Meraki: Auto Channel", available online at <https://documentation.meraki.com/MR/Monitoring_and_Reporting/Location_Analytics/Meraki_Auto_RF%3A_Wi-Fi_Channel_and_Power_Management#Auto Channel>, 2018, 9 pages.
(Continued)

*Primary Examiner* — Edan Orgad
*Assistant Examiner* — Emmanuel K Maglo
(74) *Attorney, Agent, or Firm* — McDermott Will & Emery

(57) ABSTRACT

Methods for assigning effective isotopic radiated power to an access point in a wireless network are provided. In one aspect, a method includes determining weights for neighboring access points in a wireless network based on channel frequency and basic service set color assignments. For a particular access point, a first path loss based on the determined weights and a second path loss based on the neighboring access points are calculated. First and second effective isotropic radiated power values are calculated based on the respective first and second path losses. The effective isotropic radiated power of the particular access point is adjusted based on the lower of the first and second calculated (Continued)

effective isotopic radiated power values. Systems and machine-readable media are also provided.

18 Claims, 7 Drawing Sheets

(56) References Cited

U.S. PATENT DOCUMENTS

| | | | |
|---|---|---|---|
| 9,585,143 B2 | 2/2017 | Tang et al. | |
| 2006/0199546 A1* | 9/2006 | Durgin | H04B 17/318 455/67.11 |
| 2009/0080377 A1 | 3/2009 | Ganguly et al. | |
| 2009/0190500 A1* | 7/2009 | Ji | A61P 35/00 370/254 |
| 2011/0243020 A1 | 10/2011 | Ponnuswamy | |
| 2012/0119880 A1 | 5/2012 | Ponnuswamy | |
| 2013/0237202 A1 | 9/2013 | Tokgoz et al. | |
| 2014/0307704 A1 | 10/2014 | Arogyaswami | |
| 2015/0282043 A1 | 10/2015 | Fang et al. | |
| 2016/0037542 A1 | 2/2016 | Tang et al. | |
| 2016/0345258 A1 | 11/2016 | Zhou et al. | |
| 2016/0381591 A1 | 12/2016 | Lysejko et al. | |
| 2017/0048715 A1 | 2/2017 | Fan et al. | |
| 2017/0085461 A1 | 3/2017 | Zhou et al. | |
| 2017/0117950 A1* | 4/2017 | Strong | H04B 7/0452 |
| 2017/0135131 A1 | 5/2017 | Hart et al. | |
| 2017/0257817 A1 | 9/2017 | Itagaki et al. | |
| 2017/0359300 A1 | 12/2017 | Patil et al. | |
| 2018/0084554 A1 | 3/2018 | Chu et al. | |
| 2018/0184285 A1 | 6/2018 | Patil et al. | |
| 2018/0270038 A1 | 9/2018 | Oteri et al. | |
| 2019/0036578 A1 | 1/2019 | Zirwas et al. | |
| 2019/0124542 A1 | 4/2019 | Pandey et al. | |

FOREIGN PATENT DOCUMENTS

| | | |
|---|---|---|
| CN | 106856629 A | 6/2017 |
| WO | 2014/025465 A1 | 2/2014 |
| WO | 2016/112306 A1 | 7/2016 |
| WO | 2017/171788 A1 | 10/2017 |

OTHER PUBLICATIONS

Extended European Search Report Received for EP Patent Application No. 18174186.9, dated Nov. 27, 2018, 10 pages.
Extended European Search Report Received for EP Patent Application No. 19164835.1, dated Jul. 2, 2019, 7 pages.
Geonjung Ko, "BSS Color Settings for a Multiple BSSID Set", IEEE S02.11-16/0042r2, Jan. 19, 2016, pp. 1-10.
Koichi Ishihara, "Consideration of asynchronous interference in OBSS environment", IEEE 11-14/114Sr1, Sep. 16, 2014, pp. 1-10.
Selinis et al., Exploiting the Capture Effect on DSC and BSS Color in Dense IEEE 802.11ax Deployments, (Research Paper), Workshop on NS-3, Jun. 13, 2017, pp. 47-54.
U.S. Appl. No. 15/700,161, filed Sep. 10, 2017, by Hahn et al.
U.S. Appl. No. 15/796,747, filed Oct. 27, 2017, by Hahn et al.
U.S. Appl. No. 15/817,867, filed Nov. 20, 2017, by Hahn et al.
U.S. Appl. No. 15/963,827, "Selecting Basic Service Set Color Values", filed Jan. 31, 2018, pp. 1-33.
Yasuhiko Inoue, "Discussion on the Receiver Behavior for CCAC DSC with BSS Color", IEEE S02.11-15/0595r2, May 12, 2015, pp. 1-13.

* cited by examiner

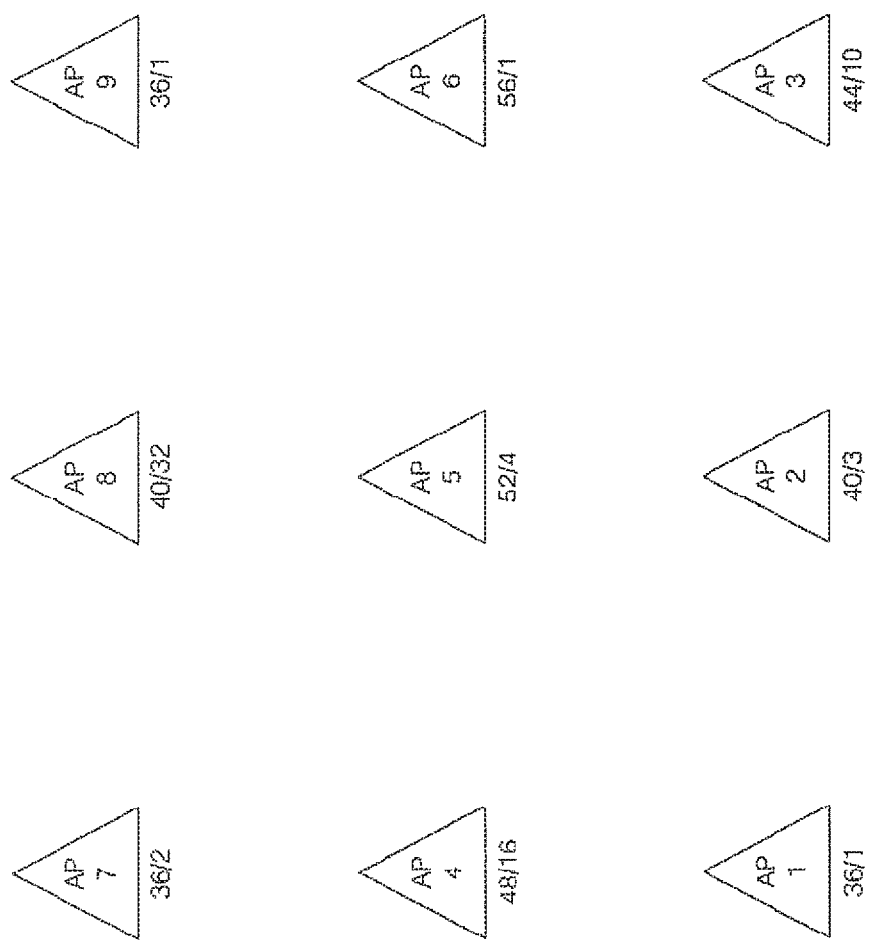

BASIC SERVICE SET COLOR-BASED EFFECTIVE ISOTROPIC RADIATED POWER ASSIGNMENT FOR ENTERPRISE NETWORKS

BACKGROUND

Basic service set (BSS) colors and channel assignments are provided as fields in wireless packets by IEEE 802.11. Multiple available values of BSS colors may be assigned to a channel, where the BSS colors are used to recognize and distinguish overlapping signals. Each access point in a wireless network has associated color, channel and effective isotopic radiated power (EIRP) attributes. For any particular access point, if a color and channel assignment is already given, assigning an EIRP to the particular access point is commonly difficult.

The description provided in the background section should not be assumed to be prior art merely because it is mentioned in or associated with the background section. The background section may include information that describes one or more aspects of the subject technology.

SUMMARY

According to certain aspects of the present disclosure, a method is provided. The disclosed method provides for using a network device to determine a weight for each neighboring access point of a plurality of neighboring access points in a radio frequency neighborhood of a particular access point based on at least a channel frequency and a basic service set color of the plurality of neighboring access points in the radio frequency neighborhood of the particular access point. The method also calculates a first path loss from the neighboring access points based on the determined weights of each neighboring access points, and also calculates a second path loss based on the neighboring access points. The method further calculates first and second effective isotopic radiated power values based on the calculated first and second path losses. The method also adjusts the effective isotopic radiated power associated with the particular access point based on a lower value between the first effective isotopic radiated power and the second effective isotopic radiated power.

According to certain aspects of the present disclosure, a system is provided. The disclosed system provides for a memory and a processor configured to execute instructions to determine and adjust an effective isotopic radiated power associated with a particular access point in a wireless network. The system determines one of a first weight, a second weight, a third weight, a third priority weight, a fourth weight and a fourth priority weight for each neighboring access point of a plurality of neighboring access points in a radio frequency neighborhood of a particular access point. The weight is based on at least a channel frequency and a basic service set color of each neighboring access point. The system further calculates a first path loss from the neighboring access points based on the determined weights of each neighboring access point, and also calculates a second path loss based on the neighboring access points. The system further calculates first and second effective isotopic radiated power values based on the calculated first and second path losses. The system then adjusts the effective isotopic radiated power associated with the particular access point based on the lesser of the first and second effective isotopic radiated power values.

According to certain aspects of the present disclosure, a machine-readable storage medium is provided. The disclosed machine-readable storage medium has instructions that cause a processor to determine and adjust an effective isotopic radiated power associated with a particular access point in a wireless network. The processor determines a weight for each neighboring access point in a radio frequency neighborhood of a particular access point. The weight is based on at least a channel frequency and a basic service set color of each neighboring access point. The processor also calculates a first path loss from the neighboring access points based on the determined weights of each neighboring access point, and also calculates a second path loss based on the neighboring access points. The processor further calculates first and second effective isotopic radiated power values based on the calculated first and second path losses. The processor also adjusts the effective isotopic radiated power associated with the particular access point based on the lesser of the first and second effective isotopic radiated power values.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4C are example illustrations associated with the example process of FIG. 3.

Figure 1:
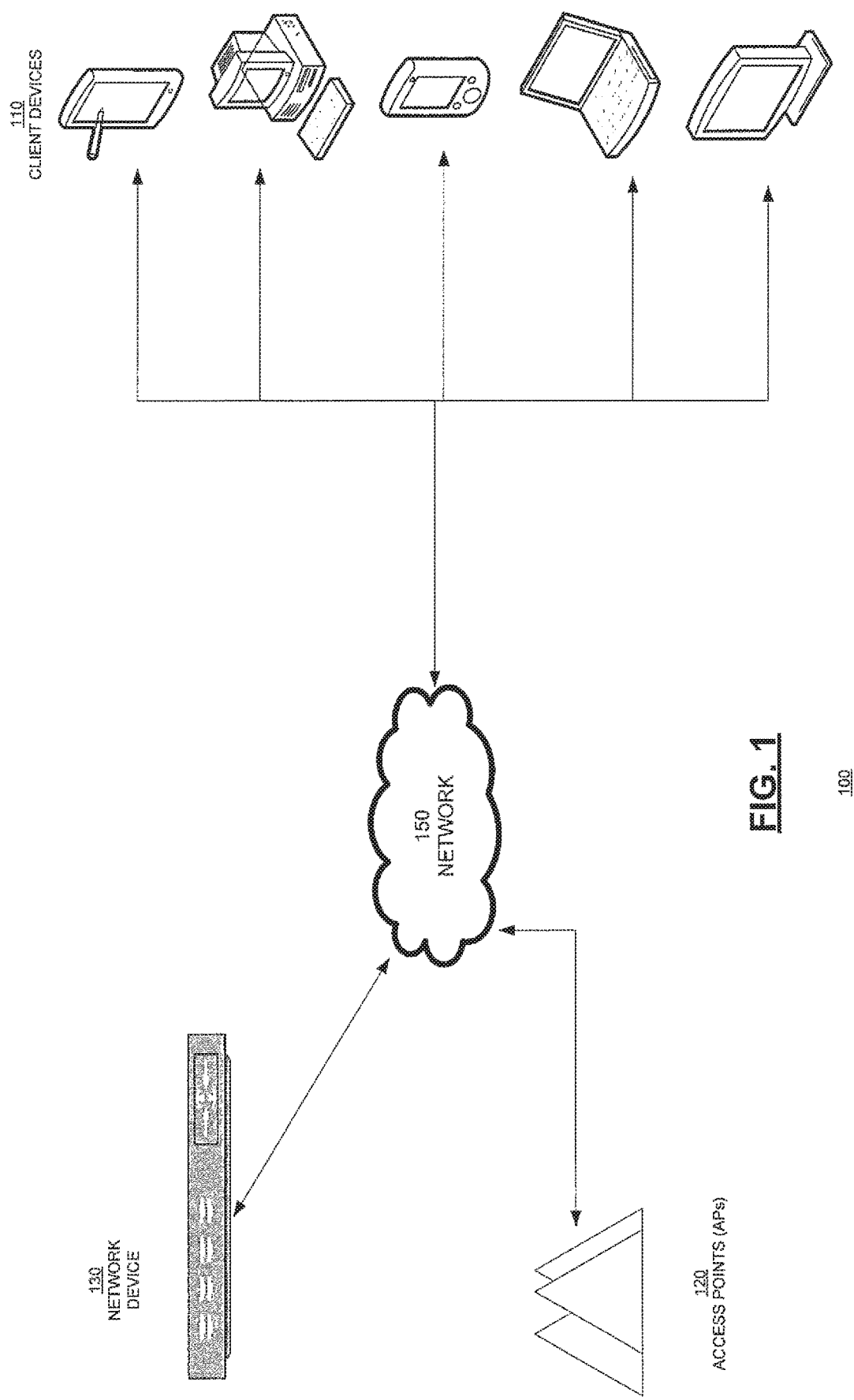
FIG. 1 illustrates an example architecture providing a BSS color based EIRP assignment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for assigning EIRP in a wireless network (e.g., IEEE 802.11ax) when BSS color and channel assignments are already given or known. A wireless network includes radio frequency (RF) neighborhoods, where an RF neighborhood is a group of access points that can physically hear one another's neighbor messages above a specified noise floor (e.g., −95 dBm). For any particular access point in a wireless network, the neighboring access points may change channels and/or colors. The system calculates an EIRP to assign to the particular access point based on the probabilities of the neighboring access points having the same channel and color attributes as the particular access point.

Accordingly, the system may assign an EIRP to every access point in the wireless network, or in a specified subset of the wireless network. The system calculates and assigns the EIRPs to achieve several optimization goals. One optimization goal is to achieve good spatial reuse with existing channel and color assignment to preserve network performance. Also, if any events such as radar and/or noise detection are triggered at a particular access point, thus forcing the particular access point to change the channel, another optimization goal is to ensure that neighboring access points are not affected by the change. Further, as there is a mechanism available in IEEE 802.11ax for an access point to change color without changing the channel, an access point may change its color based on certain implementation based events. Thus, another optimization goal achieved by the system is to minimize the effect of disruptions in the network caused by a change of colors by an access point. Yet another optimization goal of the system is to assign EIRPs to the access points without affecting roaming procedures.

The disclosed system provides an improvement to computer network functionality by providing a centralized way of assigning EIRP to a particular access point in a wireless network based on BSS color assignments. While rudimentary methods to approach different aspects of assigning EIRP to access nodes exist, no centralized solution based on BSS color assignment is known. Thus, the disclosed system and method improve computer network functionality by each of preserving network performance using spatial reuse with existing channel and BSS color assignment, providing that neighboring access points are not affected if a particular access point is force to change its channel, minimizing effects of disruptions from an access point changing its BSS color, and not affecting roaming procedures.

For example, in a typical computer network having hundreds or thousands of access points, it is readily apparent that monitoring and assigning an EIRP to each access point every time the network parameters change is far beyond the capabilities of a person or team of people to handle. Thus, the disclosed system provides a heretofore unknown centralized method of dynamically assigning EIRP to access points as network parameters constantly change (e.g., access points added or removed, channels and/or BSS colors of any given access point change due to network conditions), thereby immensely improving the computer network functionality, Example System Architecture FIG. 1 illustrates an example architecture 100 for assigning EIRP in a wireless network. The architecture 100 includes network devices 130, access points 120 and client devices 110 connected over a network 150.

At least one network device 130 is configured to host an EIRP assignment application that calculates and adjusts the EIRP for a particular access point 120 in a wireless network based on channel and color attributes of neighboring access points 120. For purposes of load balancing, multiple network devices 130 can host the EIRP assignment application. The network devices 130 can be any device having an appropriate processor, memory, and communications capability for hosting the EIRP Assignment application. For example, the network device 130 may be any device including but not limited to an access point, a wireless controller, a network controller, a server, and any form of virtualized computing appliance.

The EIRP assignment application on a network device 130 determines for a particular access point 120, a weight for each neighboring access point 120 based on assigned channels and colors for the access points 120. The EIRP assignment application on the network device 130 also calculates multiple effective EIRPs based on different path losses with the neighboring access points 120. As such, the disclosed system can, for example, calculate an EIRP to assign to the particular access point 120. As a result, the EIRP of the particular access point 120 may be adjusted by the network device 130 in order to achieve one or more optimization goals.

The client devices 110 to which the network devices 130 and access points 120 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. In certain aspects, one or more of the network devices 130 can be a cloud computing server of an infrastructure-as-a-service (IaaS) and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example EIRP Assignment System

Figure 2:
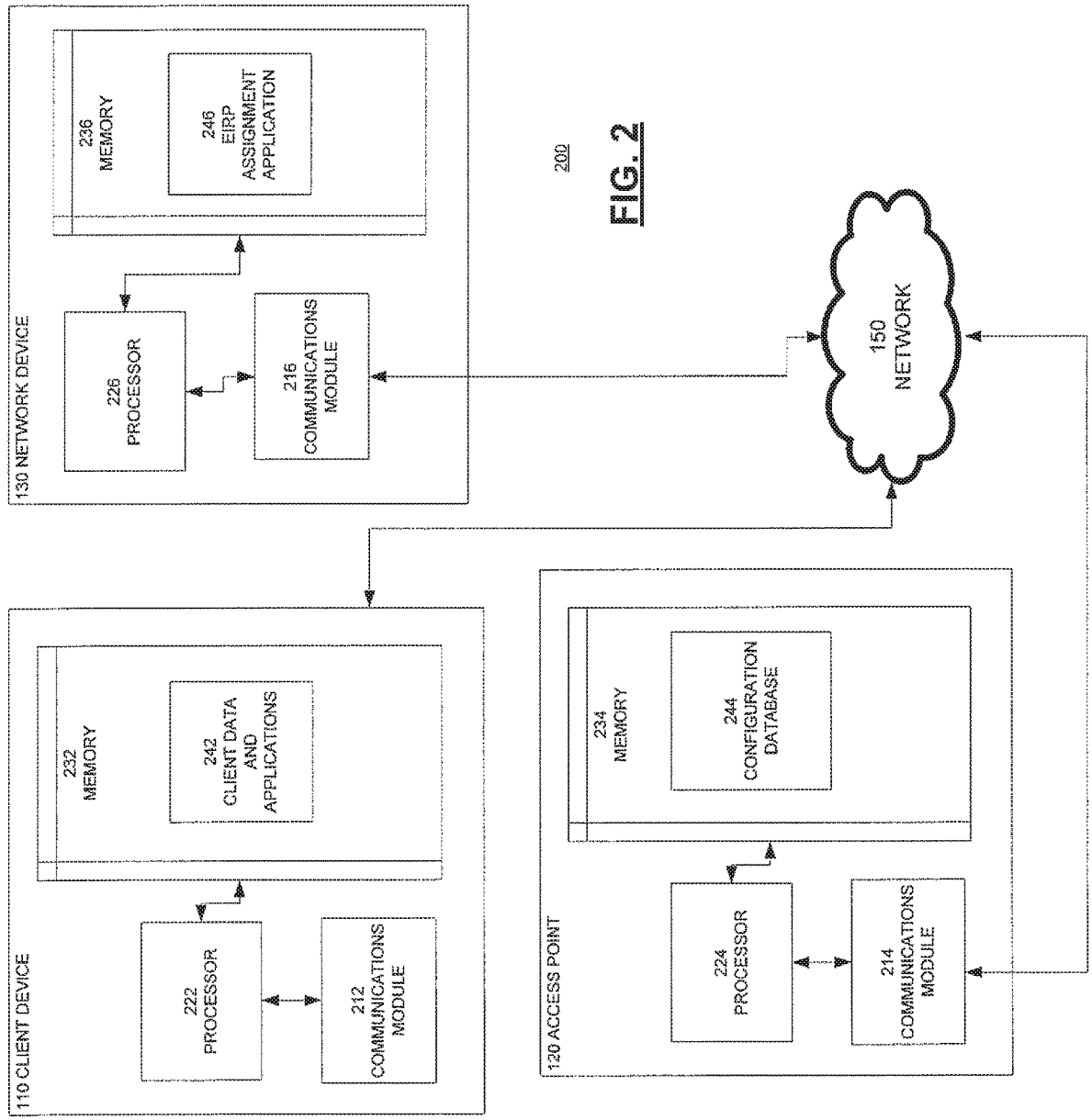
FIG. 2 is a block diagram illustrating an example client device, access point and network device from the architecture of FIG. 1 according to certain aspects of the disclosure.

FIG. 2 is a block diagram illustrating an example network device 130, access point 120 and client device 110 in the architecture 100 of FIG. 1 according to certain aspects of the disclosure.

The client device 110, access point 120 and the network device 130 are connected over the network 150 via respective communications modules 212, 214 and 216. The communications modules 212, 214 and 216 are configured to interface with the network 150 to send and receive information, such as data, requests, responses, and commands to other devices on the network. The communications modules 212, 214 and 216 can be, for example, modems or Ethernet cards.

The network device 130 includes a processor 226, a communications module 216, and a memory 236 that includes an EIRP assignment application 246. As discussed above, the network devices 130 can be any of an access point, a wireless controller, a network controller and a server. The processor 226 of the network device 130 is configured to execute instructions, such as instructions physically coded into the processor 226, instructions received from software in memory 236, or a combination of both. For example, the processor 226 of the network device 130 executes instructions from the EIRP assignment application 246 to determine, for a particular access point 120, a weight for each of multiple neighboring access points 120 in a radio frequency (RF) neighborhood based on BSS colors and channels assigned to each access point 120, calculate a first path loss based on the weight of each neighboring access point 120, calculate a second path loss from all of the neighboring access points 120, calculate a first EIRP based on the first path loss, calculate a second EIRP based on the second path loss, and adjust the EIRP associated with the particular access point 120 based on one of the first and second EIRPs.

The memory 236 of the network device 130 may store network attributes BSS color, channel, EIRP) for access points 120 in an RF neighborhood, an RF group, or an entire wireless network. The memory 236 also stores instructions for executing the process of determining and assigning an EIRP to access points 120 in a wireless network based on BSS color assignments.

The memory 236 also stores weights associated with access points 120. For example, the memory 236 may store six weights based upon different access point parameters. A first weight is based upon a neighboring access point 120 having the same assigned channel and same assigned basic service set color as a particular access point 120. A second weight is based upon a neighboring access point 120 having the same assigned channel and a different assigned basic service set color as the particular access point 120. The second weight is proportional to the sensitivity of the effective isotopic radiated power to basic service set color changes in relation to the number of basic service set colors available to the neighboring access point 120.

A third weight is based upon a neighboring access point having a different assigned channel and the same assigned basic service set color as the particular access point 120. The third weight is proportional to the sensitivity of the effective isotopic radiated power to channel changes in relation to the number of channels available to the neighboring access point 120. In the event the access point 120 includes DFS channels, a priority third weight is proportional to the sensitivity of the effective isotopic radiated power to DFS channel changes in relation to the number of non-DFS channels available to the neighboring access point.

A fourth weight is based upon a neighboring access point 120 having a different assigned channel and a different assigned basic service set color as the particular access point 120. The fourth weight is equal to the second weight times the third weight. In the event the access point 120 includes DFS channels, a fourth priority weight is equal to the second weight times the third priority weight. Thus, the determined weights (e.g., first weight, second weight, third weight, third priority weight, fourth weight, fourth priority weight) are mapped to each of the neighboring access points 120 and the weight map is stored in memory 236. The stored weights are used by the processor 226 to calculate path losses and EIRP values.

The memory 236 stores the path losses and EIRP values calculated by the processor 226. A first path loss is based on a number of first neighbor access points 120, the first path loss being equal to a sum of the weight assigned to each of the first neighbor access points 120 times the path loss from the corresponding first neighbor access point 120 to the particular access point 120 and divided by the sum of the weight assigned to each of the first neighbor access points 120. For example, a first neighbor access point 120 may be an access point 120 that influences the particular access point 120 the most or is influenced by the particular access point 120 the most based on the weights. However, determination of a set of first access points 120 may be made by any desired process, such as selecting a subset or the whole set of access points 120 that are sorted by any metric, including but not limited to path loss value. Based on the first path loss, a first EIRP is equal to the first path loss plus a signal to noise ratio minus a noise floor value. The noise floor value may be any desired value, such as −95 dBm, for example. A second path loss is based on a number of second neighbor access points 120, the second path loss being equal to a sum of the path loss from each second neighbor access point 120 to the particular access point 120 and divided by the number of second neighbor access points 120. For example, a second neighbor access point 120 may be any access point 120 in the RE neighborhood. However, determination of a set of second access points 120 may be made by any desired process, such as selecting a subset or the whole set of access points 120 that are sorted by any metric, including but not limited to residing within an RE neighborhood. A second EIRP is equal to the second path loss plus a signal to noise ratio minus a noise floor value.

The processor 226 also determines the lesser value between the calculated first and second EIRPs and assigns that lesser EIRP value to the particular access point 120, which is also stored in memory 236. The processor 226 may repeat the above process for each of the remaining access points 120 in the RF neighborhood, such that every access point 120 in the RF neighborhood has an assigned EIRP based on BSS colors. The processor 226 may execute the above process as an initial access point configuration and/or as a refining access point configuration based on changing access point or wireless network conditions.

The client device 110 includes a processor 222, the communications module 212, and a memory 220 that includes client data and applications 242. The access point 120 includes a processor 224, the communications module 214, and a memory 234 that includes a configuration database 244. For example, the configuration database 244 may include configuration attributes for the access point 120, such as BSS color assignment, channel assignment and EIRP assignment. An access point is a networking device that allows a Wi-Fi device to connect to a network. An access point may connect to a router as a standalone device, or an access point may be an integral component of a router.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
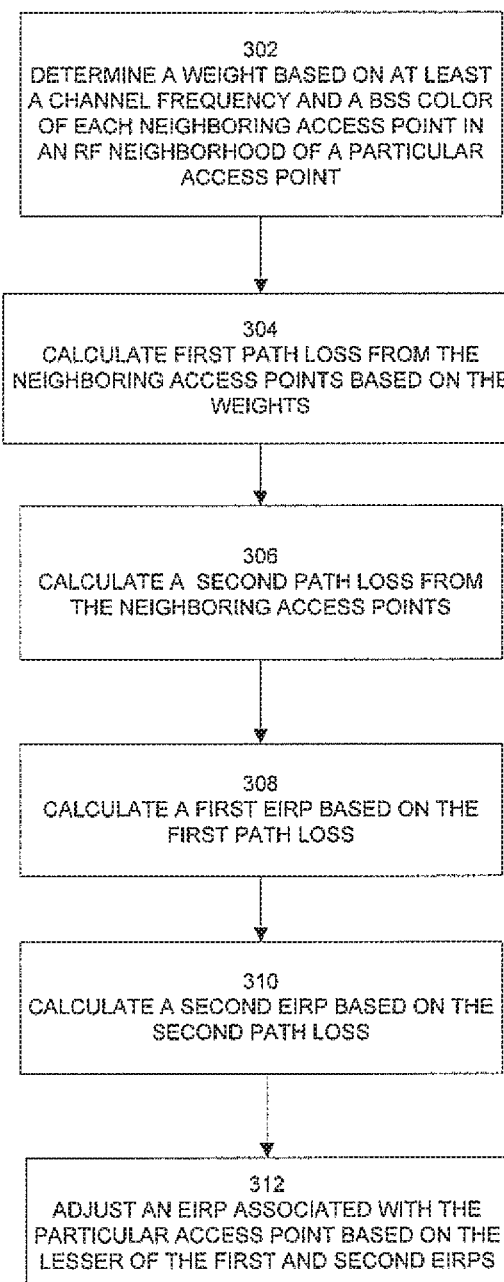
FIG. 3 illustrates an example process for providing a BSS color based EIRP assignment using the example client/server of FIG. 2.

FIG. 3 illustrates an example process 300 for assigning EIRP to an access point in a wireless network using the example access point 120 and network device 130 of FIG. 2. While FIG. 3 is described with reference to FIG. 2, it should be noted that the process steps of FIG. 3 may be performed by other systems.

The process 300 begins at step 302 by determining a weight for each neighboring access point within an RF neighborhood of a particular access point. The weight of an access point is determined based on the BSS color and channel frequency assigned to that access point. For example, if for a particular access point there are eight other access points in the RF neighborhood, then a weight is determined for each of the eight neighboring access points.

The process 300 continues in step 304 by calculating a first path loss from the plurality of selected neighboring access points based on the weight of each selected neighboring access point of the plurality of neighboring access points. Calculating a second path loss from the plurality of neighboring access points occurs in step 306. Continuing in step 308, a first EIRP is calculated based on the first path loss, and in step 310 a second EIRP is calculated based on the second path loss. The process 300 ends in step 312 by adjusting the EIRP associated with the particular access point based on a lower value between the first EIRP and the second EIRP.

FIG. 3 set forth an example process 300 for assigning EIRP to an access point in a wireless network using the example access point 120 and network device 130 of FIG. 2. An example will now be described using the example process 300 of FIG. 3 as shown in FIGS. 4A-4C.

Figure 4B:
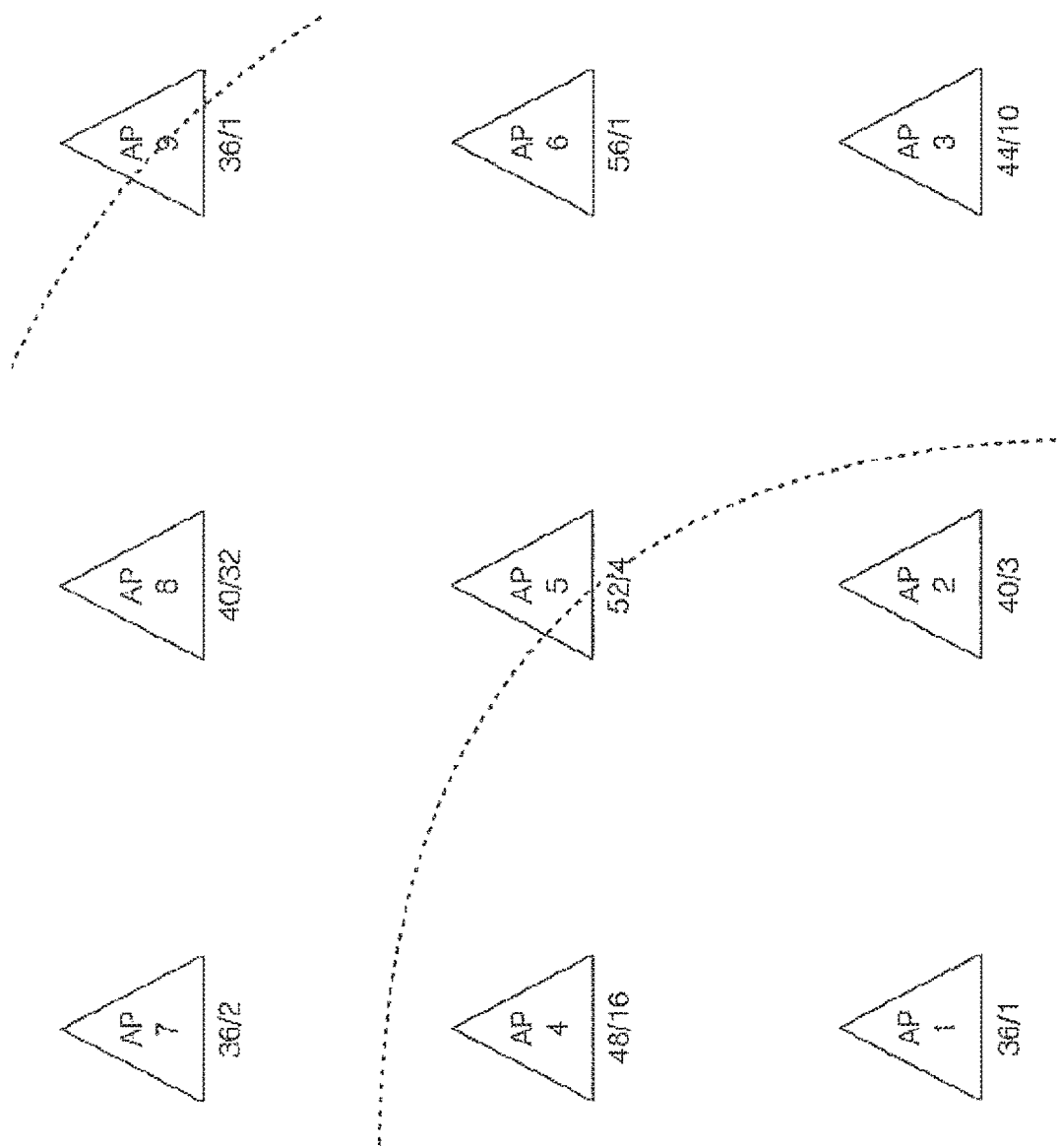
Figure 4C:
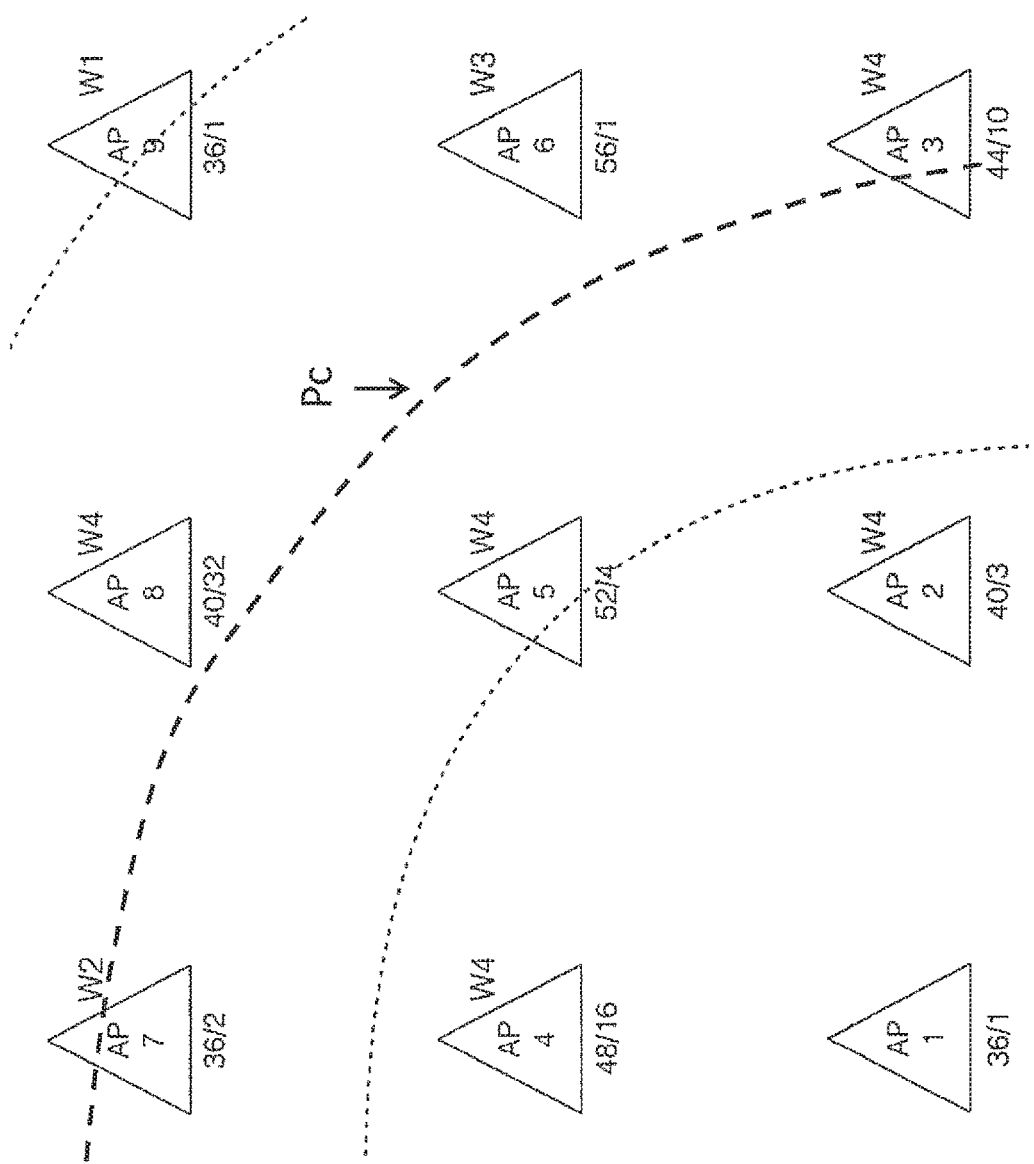

FIGS. 4A-4C show a network of nine access points labeled AP1 to AP9. Each of the access points has an assigned channel and an assigned BSS color, which is denoted as channel/color. For example, in FIG. 4A, AP1 has an assigned channel of 36 and an assigned color of 1 (e.g., 36/1). In this example, an EIRP is to be assigned to access point AP1, though the same method may be used to assign EIRP to any of the other access points AP2-AP9 as well.

As shown in FIG. 4B, the dotted curved lines show the range where the influence of access point AP1 is the most with respect to the assigned channel and BSS color based spatial reuse. In other words, Wi-Fi interference within this region can be mitigated using the right BSS color at access point AP1. In addition, the other access points within this region can mitigate access point AP1's Wi-Fi interference by using the right BSS color as well. Here, the example process 300 begins assuming that the right channel and the right BSS color have been assigned to each access point AP1-AP9 via any known method.

To calculate the EIRP for access point AP1, a path loss is used as a proxy for distance given that path loss is a metric that is quite consistent in a given frequency band. Thus, the example process 300 determines a representative path loss from access point AP1 that represents an area of maximum influence by neighboring access points within the region marked by the dotted curved lines in FIG. 4B. This is accomplished by assigning different weights to neighboring access points AP2-AP9. The weight assigned to a neighboring access point is determined by the probability of that neighboring access point having on the same channel and BSS color as access point AP1.

The weights are labeled such that W1 indicates the associated access point has the same channel and the same BSS color as access point AP1, W2 indicates the associated access point has the same channel and a different BSS color as access point AP1, W3 indicates the associated access point has a different channel and the same BSS color as access point AP1, and W4 indicates the associated access point has a different channel and a different BSS color as access point AP1.

The value of weight W1 is the largest weight since it is least desired to have two access points with the same channel and BSS color to co-exist as much as possible, thus W1 is assigned as 1 (e.g., W1=1). For weight W2, assuming the number of BSS colors available to a neighbor access point is 11, then the associated access point has W2∝1/n. Thus, in a trivial case it can be seen that W2=β3/n, where β=sensitivity of EIRP to BSS color changes, which may be user defined.

For weight W3, assuming the number of channels available to a neighboring access point is in, the associated access point has W3∝1/m. Again, in a trivial case it can be seen that W3=γ/n, where γ=sensitivity of EIRP to channel changes, which may be user defined. For an access point operating on a DFS channel there is a much higher chance for the access point to encounter an event that might force it to change the channel. Within all access points that fall under the weight W3, the process prioritizes access points that are operating on a DFS channel by bumping up the priority as W3'∝1/m', where m' is the number of channels available to the access point that are not DFS, and therefore m'≤m. In a trivial case it can be seen that W3'=γ'/n, where γ'=sensitivity of EIRP to DFS channel changes, which may be user defined. Common knowledge and field experience dictates that γ'>γ.

For weight W4, assuming the number of channels and the number of BSS colors available to a neighboring access point is in and n respectively, then W4∝1/(m×n). In a trivial case it can be seen that W4=(β×γ)/(m×n), where β and γ are defined as above. On simplifying, it can be seen that W4=W2×W3. For an access point that is operating on a DFS channel, there is a much higher chance for the access point to encounter an event that might force it to change the channel. Within all access points that fall under the weight W4, the process prioritizes access points that are operating on a DFS channel by bumping up the priority as W4'∝≤1/(m'×n), where m' is the number of channels available to the access point that are not DFS, and therefore m'≤m. On simplifying, it can be seen that W4'=W2×W3'.

There is a special case where spatial reuse is disabled at the access point. If spatial reuse is disabled, the process considers only one color as available for all access points (e.g., n=1). In this case, W1=1, W2=1, W3=γ/m, W3'∝1/m', W4=1×W3, and W4'=1×W3'.

As shown in FIG. 4C, weights have been assigned to the eight neighboring access points AP2-AP9. Based on the weights assigned to neighboring access points within the influence range (e.g., weights for neighboring access points AP3 and AP5-AP9), the example process 300 now calculates a colored path loss ($P_c$) at which access point AP1 influences the most, as well as gets influenced the most with respect to channel and BSS color. Here, $P_c$ roughly represents the "center of gravity" or "center of maximum influence." Thus, $$P_C = \frac{\sum_{i=1}^{n}(W_i * P_i)}{\sum_{i=1}^{n} W_i}$$

where, n is the number of first n neighbor access points of access point AP1, $P_c$ is the colored path loss in dB, $W_i$ is the weight assigned to access point AP1 from {W1, W2, W3, W3', W4, W4'}, and $P_i$ is the path loss from access point $AP_i$ to access point AP1 in dB. For example, the first n neighbor access points may be selected as all of the neighbor access points AP3 and AP5-AP9 that reside within the influence range shown in FIG. 4C.

The process also calculates a colorless path loss (P). This value is used to ensure that an STA associated to access point AP1 can roam properly, and is calculated as follows:

$$P = \frac{\sum_{i=1}^{n} P_i}{n}$$

where, n is the number of second n neighbor access points of access point AP1, and $P_i$ is the path loss from access point $AP_i$ to access point AP1 in dB. For example, the second n neighbor access points may be selected as all of access point AP1's neighbor access points AP2-AP9 shown in FIG. 4C.

Next, two values of EIRP are calculated. The first EIRP is calculated from $P_c$ and is referred to as colored EIRP ($EIRP_c$). The second EIRP is calculated from P and is referred to as EIRP with path loss P ($EIRP_p$).

$EIRP_c$ is calculated and assigned to access point AP1 to make sure to reach that loci of points given by $P_c$ at S dBm signal to noise ratio (SNR), which is configurable, and considering a reasonable negative 95 dBm noise floor as follows:

$EIRP_c$(in $dBm$)=$P_c$+S−95.

Similarly, $EIRP_p$ is calculated as follows:

$EIRP_p$(in $dBm$)=P+S−95.

This example is based on the noise floor value of negative 95 dBm, but the noise floor value may be different in other cases, where any appropriate noise floor value may be chosen.

The example process 300 then compares $EIRP_c$ and $EIRP_p$ and chooses the smaller one of the two in order to the effects to either performance or roaming that would result from choosing the larger one.

Hardware Overview

Figure 5:
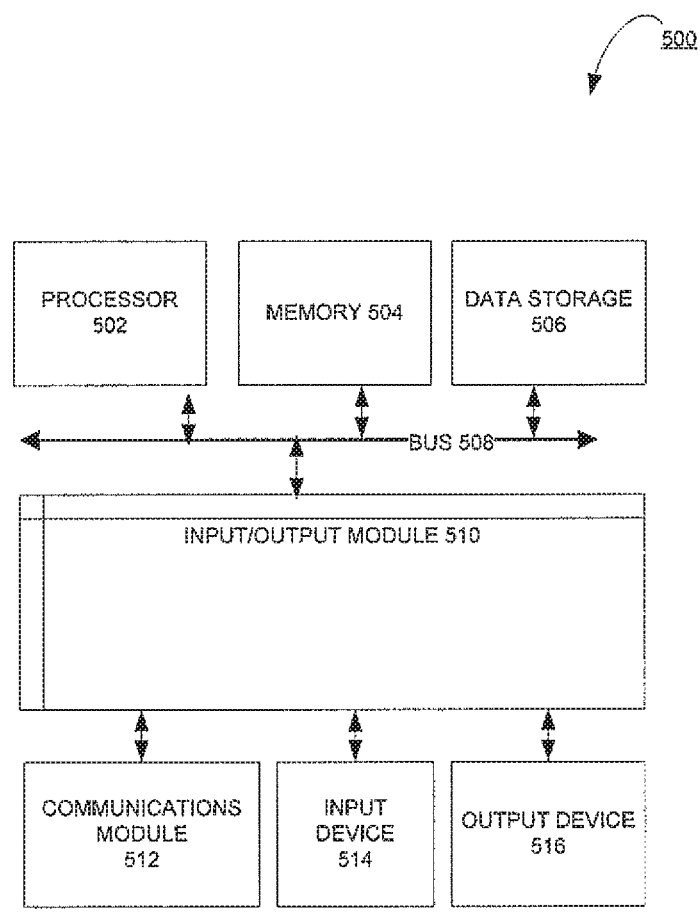
FIG. 5 is a block diagram illustrating an example computer system with which the client device, access point and network device of FIG. 2 can be implemented.

FIG. 5 is a block diagram illustrating an example computer system 500 with which the client device 110, access point 120 and network device 130 of FIG. 2 can be implemented. In certain aspects, the computer system 500 may be implemented using hardware or a combination of software and hardware, either in a dedicated server or integrated into another entity or distributed across multiple entities.

Computer system 500 (e.g., client device 110, access point 120 or network device 130) includes a bus 508 or other communication mechanism for communicating information, and a processor 502 (e.g., processor 222, 224 and 226) coupled with bus 508 for processing information. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 232, 234 and 236), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single in Line Memory Module) card interface. Such expansion memory may provide extra storage space for computer system 500 or may also store applications or other information for computer system 500. Specifically, expansion memory may include instructions to carry out or supplement the processes described above and may include secure information also. Thus, for example, expansion memory may be provided as a security module for computer system 500 and may be programmed with instructions that permit secure use of computer system 500. In addition, secure applications may be provided via the SWIM cards, along with additional information, such as placing identifying information on the SIMM card in a non-packable manner.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communications modules 212, 214 and 216) include networking interface cards, such as Ethernet cards and modems.

The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the process example, a network device 130 might transmit code to adjust an assigned EIRP through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a stylus, a finger, a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client device 110, access point 120 and network device 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components' recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later conic to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   determining, by a network device, a weight for each neighboring access point of a plurality of neighboring access points in a radio frequency neighborhood of a particular access point based on at least a channel frequency and a basic service set color of the plurality of neighboring access points in the radio frequency neighborhood of the particular access point;
   calculating, by the network device, a first path loss from the plurality of neighboring access points based on the weights of one or more neighboring access points of the plurality of neighboring access points;
   calculating, by the network device, a first effective isotopic radiated power based on the first path loss;
   adjusting, by the network device, the effective isotopic radiated power associated with the particular access point based on the first effective isotopic radiated power.

2. The method of claim 1, wherein the weight is one of a first weight, a second weight, a third weight, a third priority weight, a fourth weight and a fourth priority weight.

3. The method of claim 2, wherein the first weight is based upon a neighboring access point having the same assigned channel and same assigned basic service set color as the particular access point.

4. The method of claim 2, wherein the second weight is based upon a neighboring access point having the same assigned channel and a different assigned basic service set color as the particular access point.

5. The method of claim 4, wherein the second weight is proportional to sensitivity of the effective isotopic radiated power to basic service set color changes in relation to a number of basic service set colors available to the neighboring access point.

6. The method of claim 2, wherein the third weight is based upon a neighboring access point having a different assigned channel and the same assigned basic service set color as the particular access point.

7. The method of claim 6, wherein the third weight is proportional to sensitivity of the effective isotopic radiated power to channel changes in relation to a number of channels available to the neighboring access point.

8. The method of claim 6, wherein the third priority weight is proportional to sensitivity of the effective isotopic radiated power to DFS channel changes in relation to a number of non-DFS channels available to the neighboring access point.

9. The method of claim 2, wherein the fourth weight is based upon a neighboring access point having a different assigned channel and a different assigned basic service set color as the particular access point.

10. The method of claim 9, wherein the fourth weight is equal to the second weight times the third weight, the second weight being proportional to sensitivity of the effective isotopic radiated power to basic service set color changes in relation to a number of basic service set colors available to the neighboring access point, and the third weight being proportional to sensitivity of the effective isotopic radiated power to channel changes in relation to a number of channels available to the neighboring access point.

11. The method of claim 9, wherein the fourth priority weight is equal to the second weight times the third priority weight, the second weight being proportional to sensitivity of the effective isotopic radiated power to basic service set color changes in relation to a number of basic service set colors available to the neighboring access point, and the third priority weight being proportional to sensitivity of the effective isotopic radiated power to DFS channel changes in relation to a number of non-DFS channels available to the neighboring access point.

12. The method of claim 2, wherein the first path loss is based on a number of first neighbor access points, the first path loss being equal to a sum of the weight assigned to each of the first neighbor access points times the path loss from the corresponding first neighbor access point to the particular access point and divided by the sum of the weight assigned to each of the first neighbor access points.

13. The method of claim 12, wherein the first effective isotopic radiated power is equal to the first path loss plus a signal to noise ratio minus a noise floor value.

14. A system comprising:
    a memory; and
    a processor configured to execute instructions which, when executed, cause the processor to:
    determine one of a first weight, a second weight, a third weight, a third priority weight, a fourth weight and a fourth priority weight for each neighboring access point of a plurality of neighboring access points in a radio frequency neighborhood of a particular access point based on at least a channel frequency and a basic service set color of each neighboring access point;
    calculate a first path loss from the plurality of neighboring access points based on the weight of one or more neighboring access points;
    calculate a first effective isotopic radiated power based on the first path loss;
    adjust an effective isotopic radiated power associated with the particular access point based on the first effective isotopic radiated power.

15. The system of claim 14, wherein the first path loss is based on a number of first neighbor access points, the first path loss being equal to a sum of the weight assigned to each of the first neighbor access points times the path loss from the corresponding first neighbor access point to the particular access point and divided by the sum of the weight assigned to each of the first neighbor access points.

16. The system of claim 15, wherein the first effective isotopic radiated power is equal to the first path loss plus a signal to noise ratio minus a noise floor value.

17. A non-transitory machine-readable storage medium comprising machine-readable instructions for causing a processor to execute a method, the method comprising:
    determining, by a network device, a weight for each neighboring access point of a plurality of neighboring access points in a radio frequency neighborhood of a particular access point based on at least a channel frequency and a basic service set color of the plurality of neighboring access points in the radio frequency neighborhood of the particular access point;
    calculating, by the network device, a first path loss from the plurality of neighboring access points based on the weight of one or more neighboring access point of the plurality of neighboring access points;
    calculating, by the network device, a first effective isotopic radiated power based on the first path loss;
    adjusting, by the network device, an effective isotopic radiated power associated with the particular access point based on the first effective isotopic radiated power.

18. The non-transitory machine-readable storage medium of claim 17, wherein the first path loss is based on a number of first neighbor access points, the first path loss being equal to a sum of the weight assigned to each of the first neighbor access points times the path loss from the corresponding first neighbor access point to the particular access point and divided by the sum of the weight assigned to each of the first neighbor access points.

* * * * *